June 16, 1925.
J. A. LANDRY
TRACTION DEVICE
Filed Dec. 24, 1923   2 Sheets-Sheet 1
1,542,149
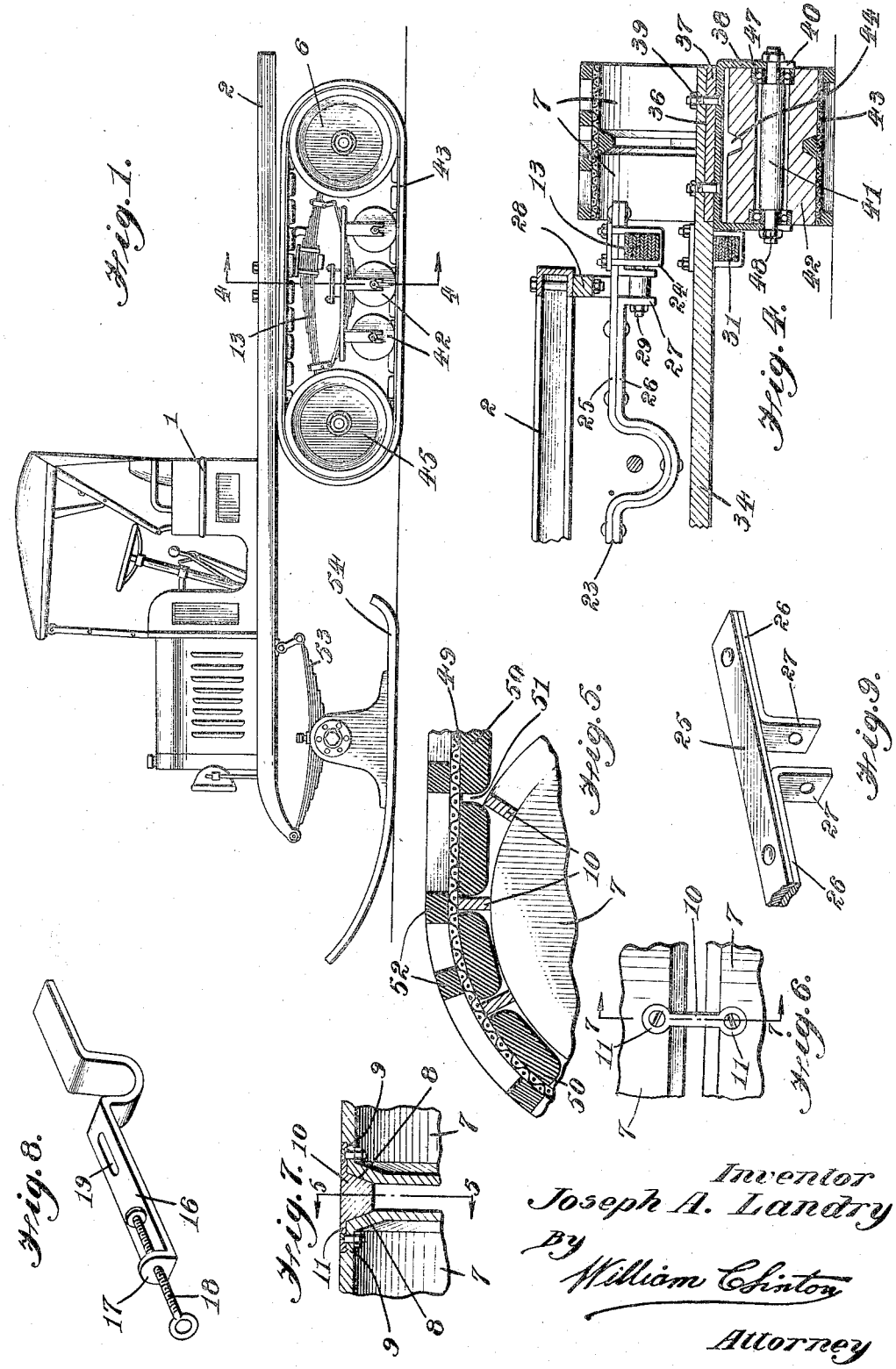

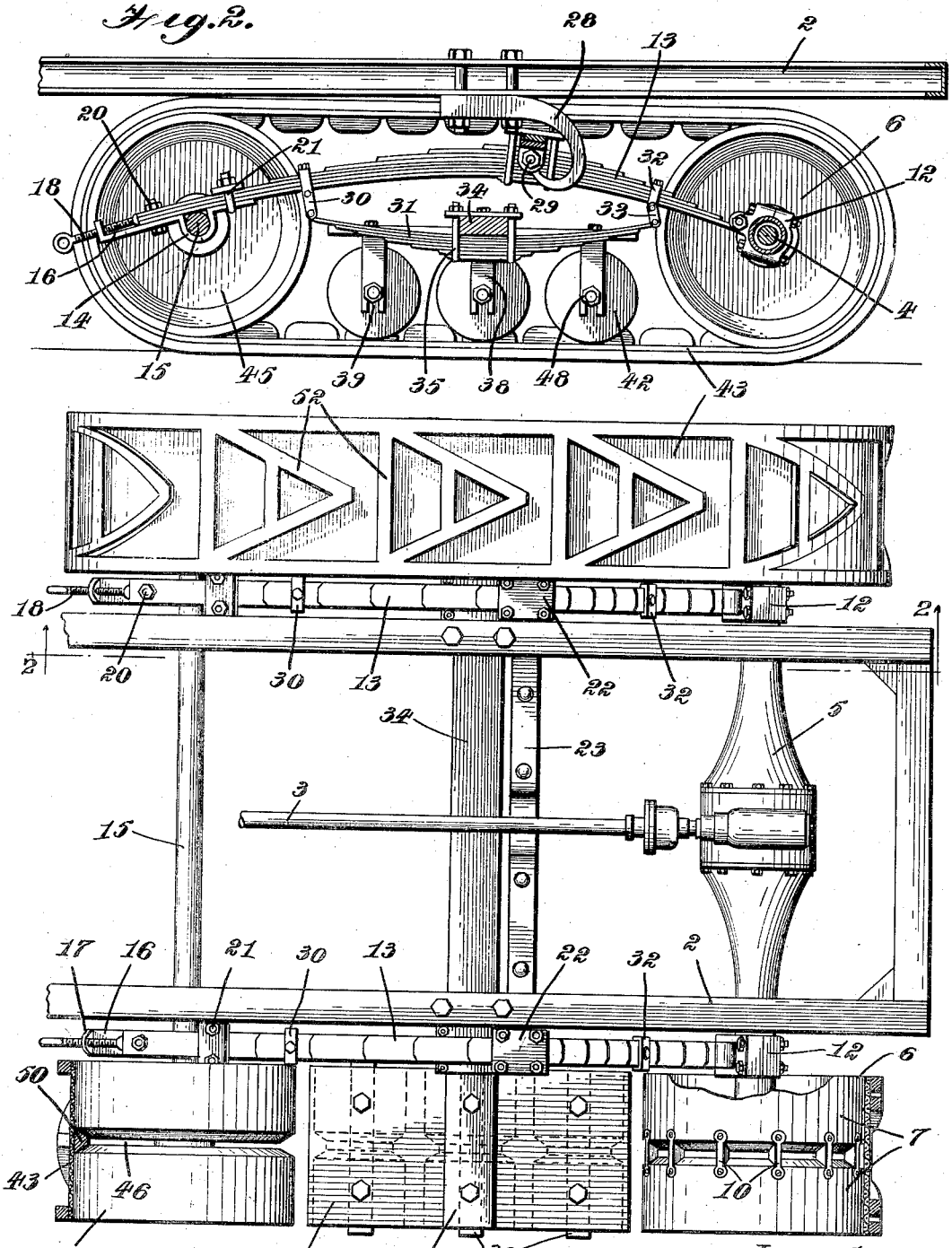

Patented June 16, 1925.

1,542,149

UNITED STATES PATENT OFFICE.

JOSEPH ADALBERT LANDRY, OF MONT-JOLI, QUEBEC, CANADA.

TRACTION DEVICE.

Application filed December 24, 1923. Serial No. 682,565.

*To all whom it may concern:*

Be it known that I, JOSEPH ADALBERT LANDRY, subject of the King of Great Britain, residing at Mont-Joli, in the Province of Quebec, Canada, have invented certain new and useful Improvements in Traction Devices; and I do hereby declare that the following is a full, clear, and exact description of the invention, such as will enable others skilled in the art to which it appertains to make and use the same.

The present invention pertains to new and useful improvements in traction devices.

The principal object of the invention is a device of this character applicable to all kinds of vehicles and particularly to sleds.

According to the construction disclosed, a motor vehicle of the usual character may be converted into a snow or ice vehicle by replacing the front wheels with runners and applying the traction device to the rear axle.

The invention includes drive wheels attached to the axle, and springs extending forwardly of the axle. The forward ends of the springs carry a shaft on which are mounted auxiliary rollers. Tread members driven by the drive wheels surround the latter and the auxiliary wheels. Suitable means are provided for adjusting the distance of the auxiliary shaft from the drive axle whereby the desired tightness of the tread member may be obtained.

The invention also includes a novel means for actuating the tread member. To this end, the drive wheels each consist of a pair of spaced drums between which are secured webs. On the inner surface of the tread member are formed a series of spaced lugs receivable between the webs, the webs being simultaneously receivable between the abutments. Guide rollers may also be provided for maintaining the lower lap of the tread member in constant contact with the surface being traversed. For this purpose, an auxiliary spring is supported in depending fashion from each main spring. A cross bar is placed across the auxiliary springs, and plates are secured to the bar. Suitable journals are fixed to the plates for carrying the guide rollers which engage the tread member. These rollers and the auxiliary wheels are grooved for the reception and accommodation of the abutments on the inner surface of the tread member.

The invention is fully disclosed in the following description and in the accompanying drawings in which:

Figure 1 is a side elevation of the device applied to a motor vehicle;

Figure 2 is a detail longitudinal section on the line 2—2 of Figure 3;

Figure 3 is a plan view showing one of the tread chains removed;

Figure 4 is a section on the line 4—4 of Figure 1;

Figure 5 is a longitudinal section through the tread chain on the line 5—5 of Figure 7;

Figure 6 is a fragmentary plan view of one of the drive wheels;

Figure 7 is a section on the line 7—7 of Figure 6;

Figure 8 is a perspective view of the wheel adjusting device; and,

Figure 9 is a perspective view of an end of the brace.

In the above views in which like reference characters are employed to designate corresponding parts throughout, the numeral 1 indicates the body of a motor vehicle including a substantially rectangular frame 2. A power shaft 3 extends from the motor and is adapted to drive the axle 4 contained within the transmission casing 5 in the usual manner.

At each end of the axle is supported a drive wheel 6 comprising a pair of spaced drums. The inner edges of the drums are beveled at 8 and recessed at 9, as shown in Figure 7. Ties or webs 10 are inserted in the space between the drums, and have flanges 11 which are secured in the recesses 9. On the inner side of each wheel 6, a bearing 12 is loosely mounted on the shaft for the reception of one end of a main spring 13. The opposite end of each spring has secured thereto a bracket 14 for supporting an end of a nonrotatable shaft 15. The bracket is formed with an extension 16 at the end of which is a lip 17. A screw 18 is threaded through the lip and abuts the extremity of the spring. The extension 16 is slotted as at 19 for the passage therethrough of a bolt 20 which also extends through the spring end. The rear portion of the bracket is held in engagement with the spring by means of a clip 21. By means of the screw 19, the position of the bracket may be adjusted relative to the spring end, and the distance of the fixed axle 15 from the drive axle 14 thereby adjusted to the extent of the slot 19.

Upon each main spring 13 near the arch thereof is passed a plate 22, the ends of a brace 23 being interposed. Clips 24 pass beneath the springs, through the brace ends and plates, and are secured to the latter. The brace member comprises upper and lower metallic sections 25 and 26, the latter being formed near its ends with depending ears 27. Gooseneck members 28 have their lower ends curled around bolts 29 received within the pairs of ears. The sides of the frame are bolted to the body portions of the goosenecks and thereby supported upon the spring, as shown in Figures 2 and 3.

At the forward ends of the main springs are mounted yokes 30 carrying the forward ends of auxiliary springs 31. The rear ends of the main springs also carry yokes 32 to which are pivotally connected shackles 33 for supporting the rear ends of the auxiliary springs. A cross bar 34 is placed across the backs of the auxiliary springs and secured thereto by means of clips 35. The ends of the bar are undercut, as at 36 for the reception of plates 37. To each plate is secured a series of inverted U-shaped members 38 by means of bolts 39 passed therethrough and also through the plates 37 and ends of the bar 34. The ends of the arms of the members 38 are slotted as at 40 for resting upon the journals 41 of the auxiliary rollers 42. The latter are adapted to rest on the lower lap of the tread chain 43, being medially grooved as at 44 in the same manner as the wheels 6. In this connection, it will be noted that the forward wheels 45 mounted on the ends of the shaft 15 are similarly grooved as at 46. The auxiliary rollers 42 are rotatable relatively to the journals 41 over the ball bearing devices 47. Nuts 48 applied to the ends of the journal prevent the latter from slipping through the slots 39.

The body of the tread member 43 consists of a fabric sheet 49. To the inner surface of the sheet are fixed abutments 50 receivable between the webs 10 and engageable thereby. It will be noted that the abutments are spaced as at 51 for the accommodation of the webs therebetween. On the outer surface of the fabric are formed the treads proper 52 consisting of hard rubber or other suitable gripping material. Obviously the treads may be formed in any desired shape. In the movement of the tread member 43 through the medium of the drive wheels 6, the abutments 50 are accommodated in the grooves 44 and 46 of the auxiliary rollers 42 and forward wheels 45 respectively.

The forward end of the frame 2 is provided with a pair of leaf springs 53 to which are secured runners 54. In this manner, the vehicle may be propelled over snowy or icy surfaces.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A traction device comprising a drive axle, a drive wheel mounted thereon, a spring extending from said axle, an auxiliary wheel carried by said spring, a tread member placed over said wheels, a vehicle body resting on said spring, an auxiliary spring suspended from said first named spring, a cross bar resting on said auxiliary spring, journals connected to said bar, and rollers received in said journals and engaging said tread member.

2. A traction device comprising a drive axle, a drive wheel carried thereby, a spring extending from said axle, a shaft adjustably connected to said spring, an auxiliary wheel carried by said shaft, a tread member surrounding said wheels, a vehicle body resting on said spring, an auxiliary spring suspended from said first named spring, a cross bar resting on said auxiliary spring, journals connected to said bar, and rollers received in said journals and engaging said tread member.

3. A traction device comprising a drive axle, a drive wheel carried thereby, a spring extending from said axle, a bracket carried by the free end of said spring, said bracket having an extension and a lip formed with said extension, a screw passing through said lip and engaging the spring end, a slot formed in said extension, a bolt passing through said spring end and slot, a shaft carried by said bracket, an auxiliary wheel mounted on said shaft, a tread member passed over said wheels, a vehicle body resting on said spring, an auxiliary spring suspended from said first named spring, a cross bar resting on said auxiliary spring, journals connected to said bar, and rollers received in said journals and engaging said tread member.

4. A traction device comprising a drive axle, a drive wheel mounted thereon, a spring extending from said axle, an auxiliary wheel supported by said spring, a tread member surrounding said wheels, a brace resting on said spring, a gooseneck extending upwardly from said brace, and a vehicle body resting on said gooseneck.

5. A traction device comprising a drive axle, a drive wheel mounted thereon, a spring extending from said axle, an auxiliary wheel supported by said spring, a tread member surrounding said wheels, a brace resting on said spring, a gooseneck extending upwardly from said brace, a vehicle body resting on said gooseneck, an auxiliary spring depending from said first named spring, a cross bar resting on said auxiliary spring, a plate secured to said cross bar, journals attached to said plate, and rollers mounted in said journals, said rollers engaging said tread member.

6. A traction device comprising a drive axle, a drive wheel including a pair of spaced drums mounted thereon, webs secured in the space between said drums, a spring extending from said axle, an auxiliary wheel supported by said spring, a tread member passed over said wheels, said member being provided with abutments on its inner surface, said abutments being adapted for reception between said webs, an auxiliary spring depending from the first named spring, a cross bar resting on said auxiliary spring, a plate secured to the cross bar, journals attached to said plate, rollers mounted in said journals, said rollers being grooved for the accommodation of said abutments.

In witness whereof I have hereunto set my hand.

JOSEPH ADALBERT LANDRY.

Witnesses:
A. BOUCHER,
L. P. MIGNAULT.